(12) United States Patent
Lacroix et al.

(10) Patent No.: US 6,814,341 B2
(45) Date of Patent: Nov. 9, 2004

(54) QUICK CONNECT COUPLINGS FOR LIMITING OVERHEATING OF PRESSURIZED GASES AND USE THEREOF

(75) Inventors: Jean-Jacques Lacroix, Lovagny (FR); André Pavan, Faverges (FR)

(73) Assignee: Staubli Faverges, Faverges (FR)

( * ) Notice: Subject to any disclaimer, the term of this patent is extended or adjusted under 35 U.S.C. 154(b) by 45 days.

(21) Appl. No.: 10/109,852

(22) Filed: Apr. 1, 2002

(65) Prior Publication Data

US 2002/0140228 A1 Oct. 3, 2002

(30) Foreign Application Priority Data

Apr. 3, 2001 (FR) .............................................. 01 04513

(51) Int. Cl.[7] .............................................. F16K 51/00
(52) U.S. Cl. .................................. 251/149.6; 251/149.1
(58) Field of Search .............................. 251/149–149.9

(56) References Cited

U.S. PATENT DOCUMENTS

| | | | |
|---|---|---|---|
| 1,869,411 A | | 8/1932 | Mooy |
| 2,777,716 A | | 1/1957 | Gray |
| 3,643,695 A | * | 2/1972 | Stroh et al. ............... 251/149.6 |
| 4,982,761 A | * | 1/1991 | Kreczko et al. ........ 137/614.03 |
| 5,123,446 A | * | 6/1992 | Haunhorst ............. 137/614.02 |
| 5,806,832 A | * | 9/1998 | Larbuisson .............. 251/149.6 |
| 5,823,508 A | * | 10/1998 | Nie .......................... 251/149.6 |
| 6,027,097 A | * | 2/2000 | Humphreys .............. 251/149.6 |

FOREIGN PATENT DOCUMENTS

EP 0800031 10/1997

* cited by examiner

*Primary Examiner*—Paul J. Hirsch
(74) *Attorney, Agent, or Firm*—Dowell & Dowell, P.C.

(57) ABSTRACT

A quick connect coupling for removably joining two pipes includes an upstream element and a downstream element adapted to be fitted axially with the upstream element thereby opening a valve movable between a position of opening and a position of closure. The upstream element is provided with at least one O-ring disposed to surround the valve and is adapted for connection to an upstream pipe for inlet of pressurized gas, particularly oxygen. A primary sealing zone is provided upstream of the O-ring which is dimensioned to induce a significant reduction in a flowrate of gas flowing in the direction of the O-ring in order to limit overheating of the O-ring.

8 Claims, 2 Drawing Sheets

QUICK CONNECT COUPLINGS FOR LIMITING OVERHEATING OF PRESSURIZED GASES AND USE THEREOF

BACKGROUND OF THE INVENTION

1. Field of the Invention

The present invention relates to a quick connection for removably joining two pipes, and more particularly to such a connection enabling an upstream tank of oxygen to be placed in fluidic communication with a downstream pipe for distributing this gas.

2. Description of the Related Art

Such a connection conventionally comprises an upstream element, usually constituting the female part of this connection, which is connected to the tank of the gas, as well as a downstream element, usually constituting the male part of the connection, which is connected to the distribution pipe. These two upstream and downstream elements are adapted to be fitted axially, which then provokes opening of a valve slidably mounted in the body of the upstream element so as to ensure free passage of the fluid.

The female part of the quick connection is equipped with a spring-loaded lock, mounted to slide in the body of this female part, transversely to the direction of displacement of the valve. This body is pierced with a central part intended for the male element to fit therein, and at least one O-ring made of elastomer or plastics material is further provided, disposed in the vicinity of the valve.

However, this known quick connection, described in particular in EP-A-0 077 743, presents a drawback.

In effect, when the gas conveyed is subjected to sudden rises in pressure, the O-rings disposed in the vicinity of the valve of the upstream element become inflamed, which is prejudicial to the mechanical soundness of the connection and is therefore detrimental to its correct use. Moreover, the inflammation of the O-rings sometimes provokes combustion of the connection assembly, which may be at the origin of serious accidents in view of the presence of oxygen.

It is an object of the present invention to overcome this drawback by producing a quick connection or coupling which, while ensuring a reliable connection between the two pipes which are connected thereto, is particularly robust, in particular in terms of resistance to overheating, whatever the operating conditions to which the coupling is subjected.

SUMMARY OF THE INVENTION

To that end, this invention relates to a quick connection or coupling for removably joining two pipes though which oxygen flows, comprising an upstream element, particularly a female element, comprising means for connection to an upstream, pressurized gas inlet pipe, and a downstream element, particularly a male element, adapted to be fitted in each other axially thereby provoking the opening of a valve mounted in a body of the upstream element. The valve is moveable between a position of opening in which the upstream and downstream elements are coupled, and a position of closure in which the upstream and downstream elements are disconnected. The upstream element is provided with at least one O-ring, made of elastomer or plastic material, disposed in the vicinity of the valve, characterized in that this coupling comprises means for forming, both in the positions of opening and of closure, primary sealing zones which extend upstream of the at least one O-ring. The sealing zones have dimensions adapted to induce a significant reduction of the flowrate of gas flowing in the direction of the the at least one O-ring, in order to limit the overheating of the O-ring.

The invention also relates to the use of the connection as defined hereinabove for transporting oxygen.

BRIEF DESCRIPTION OF THE DRAWINGS

The invention will be more readily understood on reading the following description given by way of non-limiting example, with reference to the accompanying drawings, in which.

DESCRIPTION OF PREFERRED EMBODIMENT

Figure 1:
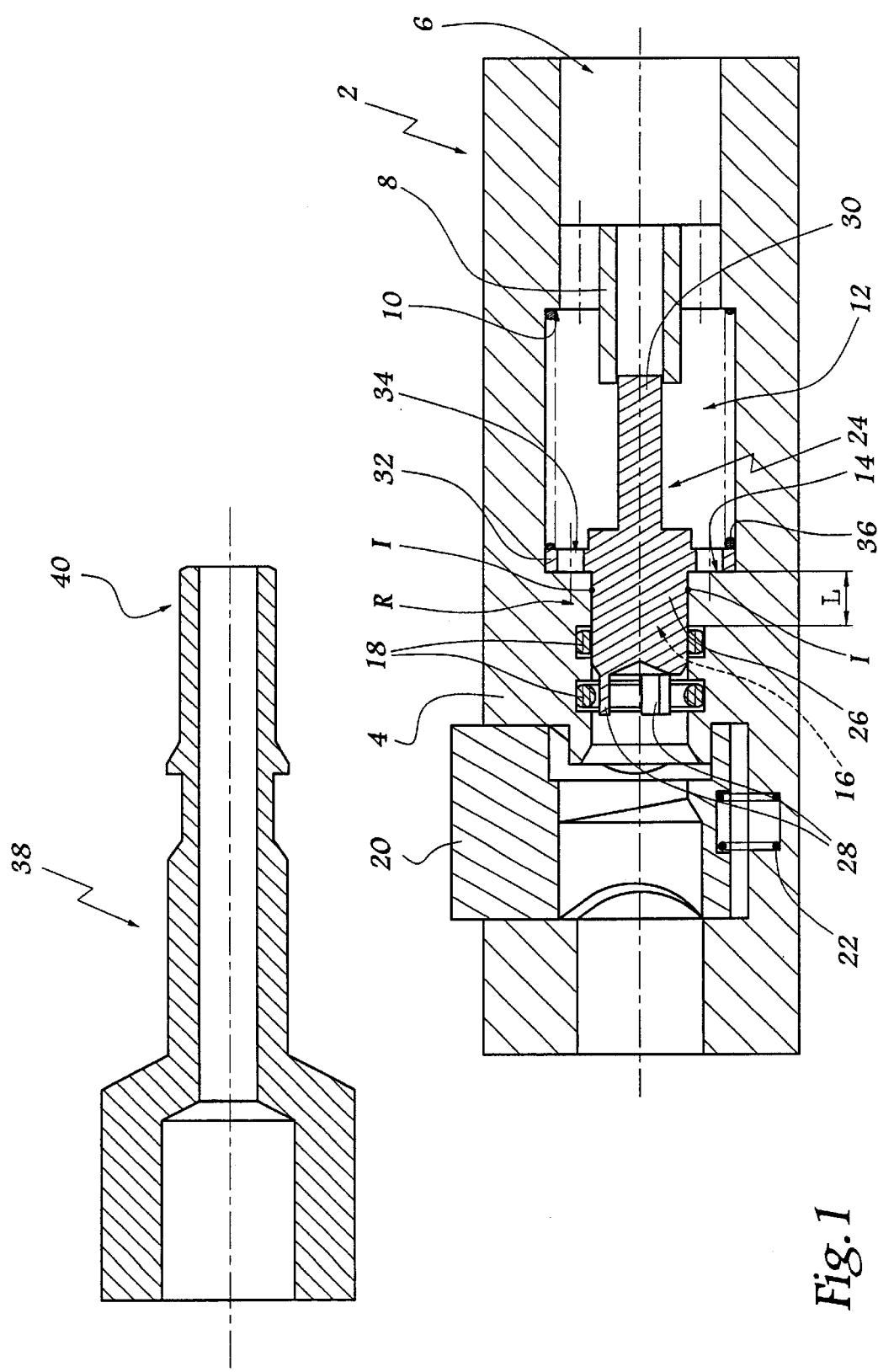
FIG. 1 is a view in longitudinal section, illustrating the upstream and downstream elements of a quick connect coupling according to the invention, mutually disconnected.
Figure 2:
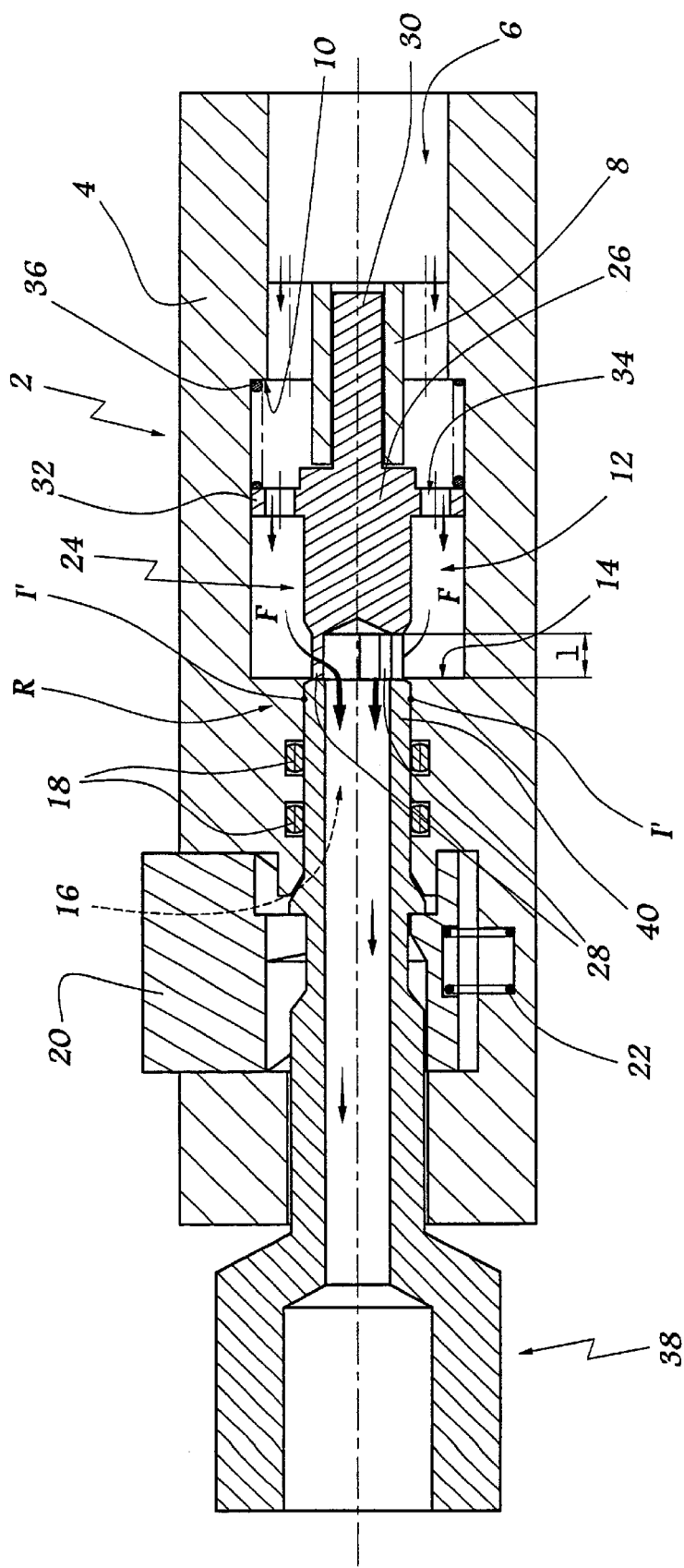
FIG. 2 is a view similar to FIG. 1, illustrating the elements of the connection of FIG. 1, once they have been connected together.

Referring now to the drawings, the quick connection shown in FIGS. 1 and 2 comprises an upstream element generally designated by reference 2, which constitutes the female part of this connection. This upstream element is conventionally connected to an installation (not shown), delivering oxygen at high pressure, for example close to 200 bars.

This upstream element 2 comprises a tubular body 4 which defines an enclosure 6 intended to be placed in communication with the afore-mentioned oxygen installation. This upstream enclosure 6 receives a separate sheath 8 within which a valve is capable of sliding, as will be described hereinafter in greater detail.

This sheath 8 forms a peripheral flange 10, beyond which a chamber 12 extends. The latter is placed in communication, via a re-entrant shoulder 14, with a cylindrical housing 16 whose diameter, or transverse dimension, is less than that of the afore-mentioned chamber 12. Grooves are hollowed out in the walls of this housing 16, which receive two O-rings 18, disposed one behind the other in the direction of flow of the gas.

Furthermore, the body 4 is provided, in its downstream part, with a lock 20 mounted to slide against a spring 22. This lock allows the removable fixation of a downstream element of the connection, as will be described hereinbelow.

A valve 24 is slidably mounted in the interior volume of the upstream element 2. It comprises a cylindrical body 26 extended, at a first end, by a plurality of axial fingers 28 defining passages. A shank 30, which extends from the body 26, opposite to the fingers 28, is free to slide in the interior volume of the sheath 8.

Furthermore, this valve 24 is provided with a radial ring 32 having bores 34 made therein. A spring 36, coming into abutment at one of its ends against the flange 10, makes it possible to return this ring 32 against the shoulder 14 of the upstream element 2.

The quick connect coupling shown in FIGS. 1 and 2 also comprises a downstream element, forming the male part of the coupling. The arrangement of this downstream element 38, as well as its mode of fixation to the upstream element 2, via the lock 20, are of conventional type. The annular free end of this downstream element 38 is given reference 40.

In the position illustrated in FIG. 1, the upstream (2) and downstream (38) elements are disconnected. Consequently, the valve is pushed by the spring 22 in downstream direction, with respect to the flow of the gas. In this arrangement, the ring 32 abuts against the shoulder 14.

The body 26 of the valve 24, received in the housing 16, is placed opposite an intermediate region R, which borders this housing 16 and lies between the upstream O-ring 18 and the shoulder 14. This intermediate region is made in massive form, in that its transverse dimensions are sufficient for it to guarantee, due to its metallic nature, an efficient dissipation of heat. This region R presents a significant longitudinal dimension, or length L.

The transverse sections of the intermediate region R and of the body 26, which correspond to the respectively inner and outer diameters of these elements, are such that the latter form an annular gap of reduced section, ensuring a primary seal.

This gap, designated by reference I, presents a small transverse section, corresponding to the clearance between the body 26 and the region R opposite. This clearance corresponds to conventional machining tolerances and allows the valve to slide easily in its housing.

In service, the rise in pressure in the chamber 12 creates a sudden rise in temperature. However, this sudden rise does not exist in the vicinity of the O-rings, thanks to the primary seal ensured by the gap I. In effect, the quantity of gas flowing in this gap I is small and undergoes a rapid cooling, the intermediate region R as well as the body 26 of the valve opposite, constituting massive metal parts which allow an efficient dispersion of heat.

Consequently, the O-rings 18 are only slightly heated and do not risk igniting.

In the position illustrated in FIG. 2, the upstream (2) and downstream (38) elements are connected to each other. In this arrangement, the fingers 28 of the valve 24 are in abutment against the frontal wall of the annular end 40 of the downstream element 38. These fingers 28 are arranged upstream of the shoulder 14, with the result that the gas is free to flow in the direction of the housing 16, via the bores 34 and the passages formed between these fingers 28.

In the position of opening of FIG. 2, the intermediate region R is opposite the annular end 40 of the downstream element 38. Their transverse sections, which respectively correspond to the inner diameter of this region R and outer diameter of this end 40, are such that these latter form an annular gap I' for passage of the gas. This gap I' presents a transverse dimension similar to that of the gap I described previously, formed by cooperation of the valve 24 and the region R.

When the pressure of the gas suddenly rises in the chamber 12, in this position of opening of the valve, the resulting sudden rise in temperature is non-existent in the vicinity of the O-rings, thanks to the gap I' which ensures a primary seal.

Consequently, similarly to what happens in the position of closure of the valve, the O-rings 18 are substantially not subject to a rise in temperature, with the result that they do not risk igniting.

The length L of the intermediate region R is advantageously greater than the length 1 of the fingers 28. In effect, this makes it possible to maintain, opposite the region R, either a part of the annular end 40, or a part of the body 26, whatever the axial positions of the downstream element and of the valve 24. Consequently, during translation of the valve 24, under the action of the downstream element 38, a portion of annular gap, of small section, permanently exists, which protects the O-rings 18 from the sudden rise in pressure of the oxygen.

The invention has been described with reference to upstream and downstream elements, respectively forming female and male parts of the connection. It is also applicable to a connection whose upstream and downstream elements respectively form male and female parts.

The invention enables the objects set forth hereinabove to be attained. In effect, Applicants have observed that the phenomena of inflammation, to which the O-rings are subjected, are principally due to sudden rises in the pressure of the oxygen flowing in the vicinity of these O-rings, inducing a considerable temperature rise.

The existence of the primary sealing zones I and I' makes it possible to dissipate the energy that the gas possesses, once it arrives in contact with the O-rings. The latter are thus subjected only to a slight temperature rise, with the result that their mechanical soundness is not affected.

What is claimed is:

1. Quick connect coupling for removably joining two pipes through which pressurized gas passes, comprising, an upstream element including means for connection to an upstream, pressurized gas inlet pipe, and a downstream element of a size to be axially received within the upstream element to thereby open a valve mounted in a body of the upstream element, said valve being movable between a first open position in which the upstream and downstream elements are coupled, and a second closed position in which the upstream and downstream elements are disconnected, said upstream element being provided with at least one O-ring, made of elastomer or plastic material, arranged to seal about said valve when said valve is in said closed position, means for forming, both in said first open position and said second closed position of said, a primary sealing zone which extends upstream of said at least one O-ring, said primary sealing zone having dimensions adapted to reduce a flowrate of gas flowing in a direction toward said at least one O-ring, in order to thereby limit overheating of said at least one O-ring.

2. The coupling of claim 1, wherein said primary sealing zone defines a gap for passage of the gas having a longitudinal dimension which is substantially greater than its transverse dimension.

3. The coupling of claim 2, wherein said means forming said primary sealing zone in said second closed position includes a massive heat exchange region of said body of said upstream element and disposed immediately upstream of said at least one O-ring, and a body of said valve being surrounded by said massive region.

4. The coupling of claim 3, wherein said means forming said primary sealing zone, in said first open position, includes said massive region and an end of said downstream element surrounded by said massive region.

5. The coupling of claim 3, wherein said massive region defines a housing for receiving said valve, said housing being in communication with an upstream zone of high pressure gas, a transverse dimension of said upstream zone being substantially greater than that of said gap.

6. The coupling of claim 5, wherein said housing and said upstream zone of high pressure define a peripheral shoulder adapted to engage a ring of said valve when said valve is in said second closed position.

7. The coupling of claim 5, wherein said at least one O-ring is disposed in walls of said housing for receiving said valve.

8. A method of reducing a risk of combustion of pressurized oxygen gas passing through a quick connect coupling having at least one O-ring for sealing oxygen flow through the coupling and wherein the coupling is connected between an upstream pipe from which pressurized oxygen is received from a source and a downstream pipe, the method including using the coupling of claim 1 to prevent overheating of the at least one O-ring during pressurized gas flow therethrough.

* * * * *